United States Patent [19]
Berthold et al.

[11] Patent Number: 5,908,679
[45] Date of Patent: Jun. 1, 1999

[54] PIPE OF POLYETHYLENE HAVING IMPROVED MECHANICAL PROPERTIES

[75] Inventors: Joachim Berthold, Kelkheim; Ludwig Böhm, Hattersheim; Werner Breuers, Eppstein; Johannes Friedrich Enderle, Frankfurt; Manfred Fleissner, Eschborn; Rainer Lecht, Kelkheim; Hartmut Lüker, Hofheim; Ulrich Schulte, Kelkheim; Heiner Brömstrup, Heidesheim, all of Germany

[73] Assignee: Hoechst Aktiengesellschaft, Germany

[21] Appl. No.: 08/944,663

[22] Filed: Oct. 6, 1997

Related U.S. Application Data

[63] Continuation of application No. 08/639,179, Apr. 26, 1996, abandoned.

[30] Foreign Application Priority Data

Apr. 28, 1995 [DE] Germany .......................... 195 15 678

[51] Int. Cl.⁶ .......................... C08L 23/06; B29D 22/00
[52] U.S. Cl. .................. 428/36.9; 428/36.92; 428/35.7; 138/DIG. 7; 526/352
[58] Field of Search ................. 428/36.9, 36.92, 428/35.7; 525/88, 240; 138/DIG. 7; 526/352

[56] References Cited

U.S. PATENT DOCUMENTS

| | | | |
|---|---|---|---|
| 4,461,873 | 7/1984 | Bailey et al. | 525/240 |
| 5,338,589 | 8/1994 | Böhm et al. | 428/36.9 |
| 5,503,914 | 4/1996 | Michie, Jr. et al. | 525/240 |

FOREIGN PATENT DOCUMENTS

| | | |
|---|---|---|
| 0 423 962 | 4/1991 | European Pat. Off. . |
| 0436520 | 7/1991 | European Pat. Off. . |
| 0603935 | 6/1994 | European Pat. Off. . |
| 0 707 040 | 4/1996 | European Pat. Off. . |
| WO 91/18934 | 12/1991 | WIPO . |
| WO 9618677 | 6/1996 | WIPO . |

*Primary Examiner*—Rena L. Dye
*Attorney, Agent, or Firm*—Connolly & Hutz

[57] ABSTRACT

The invention relates to a high strength pipe of ethylene polymer having a bimodal molecular weight distribution. Such pipe has a stress cracking resistance of $\geq 1400$ h, a fracture toughness of $\geq 7$ mJ/mm$^2$ and a modulus of creep in flexure, measured according to DIN 54852-Z4, of $\geq 1100$ N/mm$^2$. The pipe according to the invention is produced from an ethylene polymer in which the ratio of weight of the low molecular weight fraction to the weight of the higher molecular weight fraction is in the range from 0.5 to 2.0 and which has a melt flow index MFI$_{5/190°C}$ of $\leq 0.35$ g/10 min. It is particularly suitable for the transportation of gases and water.

10 Claims, No Drawings

PIPE OF POLYETHYLENE HAVING IMPROVED MECHANICAL PROPERTIES

This application is a continuation of application Ser. No. 08/639,179, filed on Apr. 26, 1996, now abandoned.

BACKGROUND OF THE INVENTION

The present invention relates to a high strength pipe of ethylene polymer having a bimodal molecular weight distribution.

Polyethylene is used in large amounts for the production of pipes, for example for gas and water transport systems, because a material having high mechanical strength, high corrosion resistance and good long-term stability is required for such pipes. Many publications describe materials having a very wide range of properties and processes for their preparation.

EP-A-603,935 has already described a molding material which is based on polyethylene, has a bimodal molecular weight distribution and is suitable, inter alia, also for the production of pipes. However, pipes produced from the molding materials according to this publication are still unsatisfactory with regard to their continuous load capacity under internal pressure, their stress cracking resistance, their low-temperature notched impact strength and their resistance to rapid crack growth.

In order to obtain pipes having balanced mechanical properties and hence an optimum combination of properties, it is necessary to use a raw material which has an even broader molecular weight distribution. Such a raw material is described in U.S. Pat. No. 5,338,589 and is prepared using a highly active catalyst which is disclosed in WO 91/18934 and in which the magnesium alcoholate is used as a gel-like suspension. It has surprisingly been found that the use of this material in shaped articles, in particular in pipes, permits a simultaneous improvement in the properties of rigidity and tendency to creep on the one hand and stress cracking resistance and toughness on the other hand, which are usually opposed in semicrystalline thermoplastics.

SUMMARY OF THE INVENTION

The invention accordingly relates to a high strength plastic pipe. The invention furthermore relates to the use of a pipe according to the invention for the construction of gas and water pipelines.

DETAILED DESCRIPTION OF THE INVENTION

The ethylene polymer from which the pipe according to the invention is produced preferably contains a polyethylene having a density (23° C.) in the range 0.94 to 0.96 g/cm$^3$ and a broad bimodal molecular weight distribution in which the ratio of the weight of the low molecular weight fraction to the weight of the higher molecular weight fraction is in the range from 0.5 to 2.0, preferably from 0.8 to 1.8. The polyethylene may contain small amounts of further monomer units, such as 1-butene, 1-pentene, 1-hexene or 4-methyl-1-pentene.

The bimodal property may be described as a measure of the position of the centers of gravity of the two individual molecular weight distributions, with the aid of the viscosity numbers VN according to ISO/R 1191 of the polymers formed in the two polymerization stages. $VN_1$ of the low molecular weight polyethylene formed in the first polymerization stage is from 40 to 80 cm$^3$/g, while $VN_{total}$ of the end product is in the range from 350 to 450 cm$^3$/g. $VN_2$ of the higher molecular weight polyethylene formed in the second polymerization stage can be calculated according to the following mathematical formula:

$$VN_2 = \frac{VN_{total} - w_1 \cdot VN_1}{1 - w_1}$$

wherein $w_1$ represents the weight fraction of the low molecular weight polyethylene formed in the first stage, measured in % by weight and based on the total weight of the polyethylene formed in both stages and having a bimodal molecular weight distribution. The value calculated for $VN_2$ is usually in the range from 500 to 880 cm$^3$/g.

The polyethylene is obtained by polymerization of the monomers in suspension, in solution or in the gas phase at temperature in the range from 20 to 120° C. and a pressure in the range from 2 to 60 bar and in the presence of a Ziegler catalyst which is composed of a transition metal compound and an organoaluminum compound. The polymerization is carried out in two stages, the molecular weight in each case being regulated with the aid of hydrogen.

The ethylene polymer for the pipe according to the invention may also contain further additives in addition to the polyethylene. Such additives are, for example, heat stabilizers, antioxidants, UV absorbers, light stabilizers, metal deactivators, peroxide-destroying compounds, basic costabilizers in amounts of from 0 to 10% by weight, preferably from 0 to 5% by weight, and fillers, reinforcing agents, plasticizers, lubricants, emulsifiers, pigments, optical brighteners, flameproofing agents, antistatic agents, blowing agents or combinations of these in total amounts of from 0 to 50% by weight.

The pipe according to the invention is produced by first plasticating the ethylene polymer in an extruder at temperatures in the range of from 200 to 250° C. and then extruding it through an annular die and cooling it. Pipes of the type according to the invention are suitable in general for all pressure classes according to DIN 8074.

Both conventional single-screw extruders having a smooth feed zone and high-performance extruders having a finely grooved barrel and a feed zone with a conveying action can be used for processing to pipes. The screws are typically designed as decompression screws having a length of from 25 to 30 D(D=diameter). The decompression screws have a discharge zone in which temperature differences in the melt are compensated and in which the relaxation stresses generated by shearing should be eliminated.

The melt arriving from the extruder is first distributed over an annular cross-section via conically arranged holes and then fed to the core-die combination via a coil distributor or a screen. If necessary, restrictor rings or other structural elements for ensuring uniform melt flow may additionally be installed before the die outlet.

Up to large pipe diameters, sizing and cooling are expediently carried out by vacuum sizing. The actual shaping is effected by means of slotted sizing sleeves which are produced from nonferrous metal to ensure better removal of heat. A water film fed to the inflow ensures rapid cooling of the surface of the pipe below the crystallite melting point and additionally serves as a lubrication film for reducing the frictional forces. The total length L of the cooling zone is chosen with the assumption that a melt at a temperature of 220° C. is to be cooled with the aid of water at a temperature of from 15 to 20° C. to such an extent that the temperature of the inner surface of the pipe is not more than 85° C.

The stress cracking resistance is a feature which has already been disclosed in EP-A 436 520. The process of slow crack growth can be substantially influenced by molecular structural parameters, such as molecular weight distribution and comonomer distribution. The number of so-called tie molecules is determined initially by the chain length of the polymer. The morphology of semicrystalline polymers is additionally adjusted by incorporation of comonomers, because the thickness of crystallite lamellae can be influenced by the introduction of short-chain branches. This means that the number of tie molecules in copolymers is greater than in homopolymers having a comparable chain length.

The stress cracking resistance of the pipe according to the invention is determined by an internal method of measurement. This laboratory method is described by M. Fleißner in Kunststoffe [Plastics] 77 (1987), page 45 et seq.. This publication shows that there is a relationship between the determination of the slow crack growth in the steady-state test on test bars notched all around and the brittle branch of the steady-state internal pressure test according to ISO 1167. A reduction in the time to failure is achieved by the reduction of the crack initiation time by the notch (1.6 mm/razor blade) in ethylene glycol as a stress crack-promoting medium at a temperature of 80° C. and a tensile stress of 5 mPa. The samples are produced by sawing three test specimens measuring 10×10×90 mm from a 10 mm thick pressed sheet. The test specimens are notched all round in the middle with a razor blade in a notching apparatus specially produced for this purpose (cf. FIG. 5). The notch depth is 1.6 mm.

The fracture toughness of the pipe according to the invention is likewise determined by an internal method of measurement on test bars which measure 10× 10×80 mm and were sawed from a 10 mm thick pressed sheet. Six of these test bars are notched in the middle with the razor blade in the notching apparatus already mentioned. The notch depth is 1.6 mm. The measurement procedure corresponds substantially to the Charpy measurement procedure according to ISO 179, with changed test specimens and altered impact geometry (abutment distance). All test specimens are thermostated at the measuring temperature of 0° C. over a period of from 2 to 3 h. A test specimen is then placed rapidly on the abutment of a striking pendulum apparatus according to ISO 179. The abutment distance is 60 mm. The fall of the 2 J hammer is triggered, the angle of fall being adjusted to 160°, the pendulum length to 225 mm and the impact speed to 2.93 m/sec. For evaluating the measurement, the quotient of impact energy consumed and initial cross-sectional area on the notch $a_{FM}$ in mJ/mm² is calculated. Only values for complete break and hinge fracture may serve as a basis for a common mean value (cf. ISO 179).

The notched impact strength$_{ISO}$ is measured according to ISO 179. The dimensions of the sample are 10×4×80 mm, a V-notch with an angle of 45°, a depth of 2 mm and a notch base radius of 0.25 mm being cut.

According to ISO 179/DIN 53453, the test procedure is as follows:

Conduct the test in the same atmosphere as that used for conditioning of the test specimens.

Measure the thickness, h, and the width, b, of each test specimen, in the center, to the nearest 0.02 mm. In the case of notched specimens, carefully measure the remaining width $b_N$ to the nearest 0.02 mm.

Check that the pendulum machine has the specified velocity of impact and that it is in the correct range of absorbed energy, W, which shall be between 10% and 80% of the pendulum energy, E.

Carry out a blank test (i.e. without a specimen in place) and record the frictional energy loss.

Lift and support the pendulum. Place the specimen on the supports of the machine in such a manner that the striking edge will hit the center of the specimen. Carefully align notched specimens so that the center of the notch is located directly in the plane of impact.

Release the pendulum. Record the impact energy absorbed by the specimen and apply any necessary corrections for frictional losses.

Calculate the Charpy impact strength of specimens $\sigma_{cN}$, expressed in kilojoules per square meter, with notches N=A, B or C, using the formula $$a_{cN} = \frac{W}{h \cdot b_N} \times 10^3$$

where
W is the corrected energy, in joules, absorbed by breaking the test specimen;
h is the thickness, in millmeters, of the test specimen;
$b_N$ is the reaining width, in millimeters, at the notch base of the test specimen.

The modulus of creep in flexure is measured according to DIN 54852-Z4 as the one-minute value.

According to DIN 54852-Z4, the designation of the flexible creep test with four-point loading is as follows:

The flexural stress $\sigma_b$, called stress for short, is the bending moment $M_b$ relative to the resistance moment W of the test specimen. The resistance moment is calculated on the basis of the width b and the height h of the test specimen, measured at room temperature prior to starting the experiment.

$$\sigma_b = \frac{M_b}{W} \quad \text{wherein} \quad W = \frac{b \cdot h^2}{6}$$

The flexural creep modulus $E_{bc}(t)$ is the quotient from the time-const ant flexural stress $\sigma_b$ and the time-dependent outer fiber $\epsilon_b(t)$:

$$E_{bc}(t) = \frac{\sigma_b}{\epsilon_B(t)}$$

In the case of the flexural creep test with four-point loading, the required weight force F is calculated on the basis of the design of the load application device.

The load application device has a symmetric design and consists of two part. Part 1 contains the deflection measuring device (for example, a dial gauge) that serves to measure the deflection f, and the two loading rollers whose axes are at a distance $l_D$ (measuring segment). Part 1 receives a compensation weight positioned so far below the test specimen that the entire center of gravity lies underneath the test specimen to the greatest extent possible. The two loading rollers of Part 1 and the two support rollers belonging to Part 2 have the same diameter d. Part 1 is inserted into Part 2 in such a way that it can only move in the vertical direction.

A device with the values d=5 mm, $l_A$=22 mm and $l_D$=60 mm is suitable for the flat-edge stressing of test specimens having the height h=4 mm, up to outer fiber strains of 2.2 %.

The bending moment $M_b$ changes somewhat as the deflection f increases. Starting at the initial value, the bending moment first reaches a minimum, after which it rises above the initial value.

If $$q = \frac{d+h}{l_A} \leq 0.431$$

the experiment can be carried out all the way to a deflection of $$f = l_D \cdot (0.043 + 0.12q)$$

without the bending moment mathematically deviating from the target value by more than ±2.5%. As a result of the limitation of the quotient $f/l_D$ that can be seen here, it is only possible to achieve a smaller radius of curvate ρ of the test specimen, and thus a larger outer fiber strain $\epsilon_b$, by reducing the measuring segment $l_D$. However, the measuring segment $l_D$ must not be shorter than the measuring length of at least 60 mm.

The weight force F necessary to apply a load to the test specimen amounts to the following in N:

$$F = A\frac{M_b}{l_A} - F_0 \text{ wherein } A = \frac{3.9}{1+\sqrt{1-q^2}}$$

if $M_b$ is used in mm and $l_A$ in mm.

The factor A takes into consideration the mean deviation of the bending moment from the initial value, and thus, as a rule, it is different from the value 2. $F_0$ is the weight force of Part 1 including the compensation weight.

The outer fiber strain $\epsilon_b$ is determined via the route of the radius of curvature of the test specimen on the basis of the deflection f at:

$$\epsilon_b = \frac{4hf}{l_D^2 + 4f(d+h+f)}$$

In the case of the load application device for four-point loading, the change in the bending moment $M_b$ becomes less as the deflection increases. Due to the long lever arms, very large bending moments can be applied with moderate weight force, so that it is possible, in particular, to test hard plastics as well as plastics reinforced with fiberglass. The radius of curvature ρ of the test specimen within the measuring length $l_M$ is determined by measuring the deflection fM.

A measuring clamp (reference bar) equipped with a dial gauge or another path-measuring device is affixed by means of stud bolts to four points of the mid-plane of the test specimen (of the neutral fiber) so as to form a rectangle. The length of the rectangle is the measuring length $l_M$. The measuring clamp must be rigid against vertical forces, but it must allow horizontal deformations, and this can be achieved by means of spring bands positioned at suitable sites. The weight force of the deflection measuring device can be compensated for during the entire duration of the test by means of a counterweight or else it must be taken into consideration in the calculation below.

The weight force required on each side of the load application device is:

$$F = \frac{M_b - M_0}{l_A}$$

wherein $l_A$ is the mean effective length of the lever arms, $M_0$ is the bending moment stemming from the weight force of the lever arms and, if applicable, the uncompensated weight force of the measuring clamp. The outer fiber strain $\epsilon_b$ is ascertained via the radius of the curvature of the test specimen from the deflection $f_M$ for the cross section dimensions at a measuring length of approximately 60 mm according to the approximation formula:

$$\epsilon_b = h \cdot \left(4.052\frac{f_M}{l_M^2} + 5.9\frac{f_M^3}{l_M^4} + 3.8\frac{f_M^4}{h_M \cdot l_M^4}\right)$$

wherein $h_M$ is the length of the left of the measuring clamp, which should be at least 24 mm. At deflections of up to 0.05 $l_M$, the contribution of the third member in the parenthesis is negligibly small. In the case of deflections up to 0.01 $l_M$, only the first member is essential:

$$\epsilon_b = 4.052\frac{h \cdot f_M}{l_M^2} \text{ for } 0 \leq \frac{f_M}{l_M^2} \leq 0.01$$

The S4 test (small scale steady state test) is used for determining the resistance of the pipe to rapid crack propagation and is carried out on pipes of dimension PN 10 with a diameter of 110 mm. The exact procedure is described in ISO/DIS 13477. This method is used to determine the critical pressure $p_c$ in bar, above which the pipe under this pressure $p_c$ cracks longitudinally over the total length.

According to ISO/DIS 13477, this standard specifies a method for determining the minimum internal air pressure "critical pressure" at which rapid crack propagation (RCP) can be sustained along a section of plastics pipe.

The test piece is a straight section of pipe, cut to a length of $d_n$, with square ends, except that the initiation end of the pipe may be chamfered to facilitate fitting over the core. If necessary to facilitate crack propagation notch the pipe surface, internal or external, along the initiation zone.

At least 6 test pieces are required.

Condition the test piece to (0±2)° C. for at least 6 hours immediately prior to testing. This will usually be attained by immersion in a water and ice mixture or in air.

Take all necessary precautions to ensure that no significant increase in temperature of the pipe occurs prior to testing.

Using pipe sections having a minimum gauge length of 1.5,$d_n$, and maintaining the gauge length at atmospheric pressure, establish initiation zone conditions (impact velocity, notch geometry etc.). To generate a crack length a of at least $d_n/3$.

Using various test pressures, p, to obtain a pattern of results conforming to 8.3, test sufficient test pieces as follows:

a) use the initiation zone conditions described above;

b) ensure that each test piece is struck within 3 min of removal from conditioning;

c) for each test piece, record it's crack length a at arrest and the ambient temperature.

Obtain sufficient results to conform to the following pattern:

at least tree resuits where a <4$d_n$ and 0.5$p_{cS4}$<p<$p_{cS4}$;

at least three results where a >4$_{dn}$ and $p_{cS4}$≦P<1.5$p_{cS4}$;

where $p_{cS4}$ is derived from a plot of a as a function of p.

The test report shall include the following information:

a) a reference to this standard and to the referring standard;

b) a complete identification of the pipe under test: manufacturer, material, nominal dimensions;

c) number of test pieces used;

d) conditioning period;
e) the plot of crack length a at arrest versus test pressure p;
f) the determined value of critical pressure, $p_{cS4}$;
g) any factors which may have affected the results, such as any incidents or;
h) date(s) of test(s).

The examples below are intended to make the invention even clearer to a person skilled in the art.

EXAMPLE 1

According to the Invention

A polymer was prepared with a catalyst and according to the method of WO 91/18934 while maintaining the operating conditions stated below in Table 1.

TABLE 1

|  | Reactor I Capacity: 120 l | Reactor II Capacity: 120 l |
|---|---|---|
| Temperature | 83° C. | 83° C. |
| Catalyst feed | 0.8 mmol/h | — |
| Cocatalyst feed | 15 mmol/h | 30 mmol/h |
| Dispersant (diesel oil) | 25 l/h | 50 l/h |
| Ethylene | 9 kg/h | 10 kg/h |
| Hydrogen in the gas space | 74% by volume | 1% by volume |
| Total pressure | 8.5 bar | 2.7 bar |

The polymer thus prepared had a melt flow index $MFI_{5/190° C.}$ of 0.2 g/10 min and a density d of 0.948 g/cm³ and was plasticated in an extruder having a diameter of 48 mm and a length corresponding to 24.4 times the diameter (≙ 117.12 cm) at a temperature of 227° C. and then extruded through an annular die having an external diameter of 32.1 mm and a core having a diameter of 26.5 mm to give a pipe having a diameter of 32.1 mm and a wall thickness of 3.08 mm, with the aid of vacuum sizing. Cooling was effected in a cooling bath which had a length of 3 m and was kept at a temperature of 15° C. The properties measured for the finished pipe are shown in Table 2 below.

COMPARATIVE EXAMPLE

An ethylene polymer prepared according to the data from Example 1 of EP-A-603 935 in a two-stage process had a melt flow index $MFI_{5/190° C.}$ of 0.48 g/10 min and a density d of 0.948 g/cm³. The ethylene polymer was processed as in Example 1 to give a pipe having the same dimension. The properties measured for the pipe are likewise listed in Table 2 below.

The abbreviations of the physical properties in Table 2 have the following meaning:

MCF=modulus of creep in flexure, measured according to ISO 54852-Z4 in N/mm² as the one-minute value, FT=fracture toughness, measured by the internal method of measurement described above, at 0° C., in mJ/mm², $NIS_{ISO}$=notched impact strength, measured according to ISO 179/DIN 53453 in mJ/mm² at −20° C. and at +23° C., SCR=stress cracking resistance, measured by the internal method of measurement according to M. Fleißner, in h, PRO=processibility, measured as extruder throughput in an extruder having a diameter D of 48 mm and a length L of 24.4 ·D at a constant screw speed of 80 revolutions per min, in kg/h, $p_c$=resistance to rapid crack growth, measured by the S4 test in bar on pipes of pressure class PN 10 with a diameter of 110 mm.

TABLE 2

|  | Example 1 | Comparison |
|---|---|---|
| MCF | 1304 | 1153 |
| FT | 8.8 | 6.5 |
| $NIS_{ISO}$ (+23/−20° C.) | 39.2/24.1 | 14.7/10.7 |
| SCR | >>1500 | 1300 |
| PRO | 28.2 | 26.3 |
| $p_c$ | >25 | about 10 |

The measured values clearly show that the pipe according to the invention had better strength properties throughout and was also more readily processable in production.

We claim:

1. A high strength pipe of polyethylene having a bimodal molecular weight distribution, a density of 0.948 g/cm³, and an $MFI_{5/190° C.}$ of 0.2 g/10 min., the pipe having a stress cracking resistance of ≧1400 h and a fracture toughness FT of ≧7 mJ/mm².

2. The pipe as claimed in claim 1, which has a modulus of creep in flexure, of ≧1100 N/mm².

3. The pipe as claimed in claim 1, which is produced from an ethylene polymer in which the ratio of the weight of the low molecular weight fraction to the weight of the higher molecular weight fraction is in the range from 0.5 to 2.0.

4. The pipe as claimed in claim 3, which is produced from an ethylene polymer which contains comonomers having 4 to 6 carbon atoms in an amount of from 0 to 0.1% by weight in the low molecular weight fraction and in an amount of from 2.5 to 4% by weight in the higher molecular weight fraction.

5. The pipe as claimed in claim 3, wherein the low molecular weight fraction of the ethylene polymer has a melt flow index $MFI_{2.16/190° C.}$ in the range from 200 to 800 g/10 min.

6. The pipe as claimed in claim 3, wherein the low molecular weight fraction of the ethylene polymer has a melt flow index $MFI_{2.16/190° C.}$ in the range from 250 to 400 g/10 min.

7. The pipe as claimed in claim 4, wherein the ethylene polymer has a melt flow index $MFI_{5/190° C.}$ of ≦0.35 g/10 min.

8. The pipe as claimed in claim 1, which has a notched impact strength $NIS_{ISO}$ of at least 15 mJ/mm² at −20° C. and of at least 20 mJ/mm² at +23° C.

9. The pipe as claimed in claim 8, which has a notched impact strength of at least 20 mJ/mm² at −20° C. and of at least 30 mJ/mm² at +23° C.

10. The pipe as claimed in claim 1, which has a resistance to rapid crack growth on a pipe of pressure class PN 10 with a diameter of 110 mm (S4test), of ≧20 bar.

* * * * *

UNITED STATES PATENT AND TRADEMARK OFFICE
CERTIFICATE OF CORRECTION

PATENT NO. : 5,908,679
DATED : June 1, 1999
INVENTOR(S) : Joachim Berthold, et al It is certified that error appears in the above-indentified patent and that said Letters Patent is hereby corrected as shown below:

Column 5, line 46, "fM" should read -- $f_M$ --.

Column 6, after line 59, "tree resuits" should read -- three results --.

Column 7, line 10, before EXAMPLE I, the following sentence should be inserted: -- The examples below are intended to make the invention even clearer to a person skilled in the art. --

Signed and Sealed this

Twelfth Day of October, 1999

Attest:

Q. TODD DICKINSON

*Attesting Officer*  *Acting Commissioner of Patents and Trademarks*